United States Patent
Necas (10) Patent No.: US 10,635,496 B2
(45) Date of Patent: *Apr. 28, 2020

(54) THREAD POOL MANAGEMENT (71) Applicant: Red Hat, Inc., Raleigh, NC (US)

(72) Inventor: Ivan Necas, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,626

(22) Filed: Aug. 27, 2018

(65) Prior Publication Data
US 2018/0365074 A1  Dec. 20, 2018

Related U.S. Application Data (63) Continuation of application No. 14/725,078, filed on May 29, 2015, now Pat. No. 10,061,619.

(51) Int. Cl.
*G06F 9/50* (2006.01)
*G06F 9/46* (2006.01)

(52) U.S. Cl.
CPC .............. *G06F 9/5038* (2013.01); *G06F 9/46* (2013.01); *G06F 9/505* (2013.01); *G06F 9/5027* (2013.01); *G06F 2209/5018* (2013.01)

(58) Field of Classification Search
CPC .......... G06F 9/46; G06F 9/5038; G06F 9/505; G06F 9/5027; G06F 2209/5018
USPC ....................................................... 718/103
See application file for complete search history.

(56) References Cited

U.S. PATENT DOCUMENTS

| | | | |
|---|---|---|---|
| 6,418,458 B1 | 7/2002 | Maresco | |
| 7,237,242 B2 | 6/2007 | Blythe et al. | |
| 7,681,196 B2 | 3/2010 | Vedula | |
| 8,185,906 B2 | 5/2012 | Muscarella | |
| 8,209,701 B1 | 6/2012 | Roytman et al. | |
| 8,234,648 B1 | 7/2012 | Joyce et al. | |
| 8,296,454 B2 | 10/2012 | Youn et al. | |
| 8,397,237 B2 | 3/2013 | Rumelhart et al. | |
| 8,677,360 B2 | 3/2014 | de Justo Teixeira et al. | |
| 2005/0022196 A1 | 1/2005 | Davis et al. | |
| 2006/0070078 A1 | 3/2006 | Dweck et al. | |
| 2008/0295107 A1 | 11/2008 | Muscarella | |
| 2010/0037222 A1 | 2/2010 | Tatsubori et al. | |
| 2010/0153957 A1 | 6/2010 | Xu | |
| 2012/0159507 A1 | 6/2012 | Kwon et al. | |
| 2013/0152097 A1 | 6/2013 | Boctor et al. | |
| 2014/0019984 A1 | 1/2014 | Li et al. | |

(Continued)

OTHER PUBLICATIONS

Pyarali, I., et al., Department of Computer Science Washington University, St. Louis, MO 63130, USA; Electrical and Computer Engineering Dept. University of California, Irvine, CA 92697, USA, "Evaluating and Optimizing Thread Pool Strategies for Real-Time CORBA", http://www.cs.wustl.edu/~schmidt/PDF/OM-01.pdf, 2001, 11 pages.

(Continued)

*Primary Examiner* — Qing Chen
(74) *Attorney, Agent, or Firm* — Lowenstein Sandler LLP (57) ABSTRACT

A method and system to assign a task to a first thread pool in view of a determination that a previous execution time associated with the task is less than or equal to a threshold execution time. A second thread pool is designated to execute one or more tasks that have an execution time that exceeds the threshold execution time. The method and system may determine that a first execution time associated with the task exceeds the threshold execution time. The task is reassigned to the second thread pool in view of the determination that the first execution time exceeds the threshold execution time.

20 Claims, 4 Drawing Sheets

(56) References Cited

U.S. PATENT DOCUMENTS

2014/0068623 A1     3/2014    Kanemasa et al.
2015/0281114 A1    10/2015    Wong

OTHER PUBLICATIONS

Bahadur, F. et al., Department of Information Technology, Hazara University, Mansehra, Pakistan; Department of Mathematics, Hazara University Mansehra, Pakistan, "FBOS: Frequency Based Optimization Strategy for Thread Pool System", http://www.academia.edu/9134838/FBOS_FREQUENCY_BASED_OPTIMIZATION_STRATEGY_FOR_THREAD_POOL_SYSTEM, 2014, 14 pages.

Ling, Y., et al., Telcordia Technologies, 445 South Street, Morristown, NJ; Department of Electrical Engineering, Hong Kong University, "Analysis of Optimal Thread Pool Size", http://dl.acm.org/citation.cfm?id=346320, Apr. 2000, 2 pages.

Notice of Allowance for U.S. Appl. No. 14/725,078, dated Apr. 23, 2018, 15 pages.

Office Action for U.S. Appl. No. 14/725,078, dated Oct. 17, 2016, 20 pages.

Office Action for U.S. Appl. No. 14/725,078, dated Feb. 22, 2017, 22 pages.

Office Action for U.S. Appl. No. 14/725,078, dated Jun. 6, 2017, 25 pages.

Office Action for U.S. Appl. No. 14/725,078, dated Oct. 6, 2017, 21 pages.

Office Action for U.S. Appl. No. 14/725,078, dated Jan. 10, 2018, 19 pages.

THREAD POOL MANAGEMENT

CROSS-REFERENCE TO RELATED APPLICATION

This is a continuation of U.S. patent application Ser. No. 14/725,078, filed on May 29, 2015. U.S. patent application Ser. No. 14/725,078 is hereby incorporated by reference herein in its entirety.

TECHNICAL FIELD

The implementations of the disclosure relate generally to computer systems and, more specifically, to dynamically managing thread pools in a computer system.

BACKGROUND

Many computing systems support the execution of multiple threads to perform tasks in parallel. Typically, the number of tasks that can be run concurrently in a particular computer system is limited by the operational environment (the amount of available processing units, memory, connections to databases, etc.). Multiple threads can be created and grouped as a pool to perform a number of tasks in parallel. However, some of the tasks can be performed faster than the others. Executions of long-running tasks can block the threads from processing other tasks (e.g., short-running tasks). As such, handling all the tasks by the same thread pool may cause all the threads in the pool to be allocated to the long-running tasks, leaving no capacity for the short-running tasks to be handled.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the disclosure provide for mechanisms for dynamically managing thread pools in a computer system. As referred to herein, a thread pool can be and/or include a pool of threads, a pool of workers, and/or a pool of any other execution units that can execute programmed instructions utilizing a certain amount of computing resources (e.g., a certain number of physical and/or virtual processing units). In one implementation, a worker can be a program associated with one or more computer resources (e.g., physical and/or virtual processing units, memory, storage space, etc.) to perform one or more tasks. In some implementations, a worker can be associated with one or more threads for execution of one or more tasks.

Prior solutions for thread pool management do not provide a solution for dynamically managing thread pools for parallel executions of user requests. For example, prior solutions generally use a single thread pool to execute tasks to fulfill a user request. As such, the number of user requests that can be processed concurrently is typically limited by the number of threads in the thread pool. In addition, a long-running task can block a thread of the pool from processing the other tasks. As another example, prior solutions usually request that a user (e.g., a developer) designate tasks to specific thread pools. As such, the user has to be aware of the thread pools that are available in the system. Moreover, the tasks are typically statically mapped to the thread pools without considering various execution times of the tasks during the lifecycle of an application.

Aspects of the disclosure address the above deficiencies by providing mechanisms (e.g., systems, methods, machine-readable media, etc.) for dynamic thread pool management. The mechanisms can manage a plurality of thread pools, each of which can have any processing capacity (e.g., a particular number of threads, workers, etc.). In one implementation, each of the thread pools can be dedicated to executions of particular tasks, such as tasks that can be completed within a predetermined time period (e.g., tasks associated with execution times equal to or less than a threshold execution time). As used herein, the term "execution time" can refer to a time period during which a task is started and completed. As an example, a thread pool can be dedicated to long-running tasks (e.g., tasks that cannot be completed within a threshold time period). As another example, a thread pool can be dedicated to short-running tasks (e.g., tasks that can be completed within a threshold time period).

The mechanisms can provide parallel executions of user requests utilizing the thread pools. For example, upon receiving a user request to perform an action (e.g., provisioning a virtual machine on a host), the mechanisms can determine an execution plan for the user request. As an example, the execution plan can include one or more tasks to be performed to fulfill the user request (e.g., creating a virtual machine, creating a Domain Name System (DNS) record for the virtual machine, powering on the virtual machine, waiting for the virtual machine to start, running a Shell Secure (SSH) script, etc.). The mechanisms can then assign the tasks to one or more thread pools for execution. For example, the mechanisms assign the tasks to a thread pool dedicated to long-running tasks. As another example, the mechanisms determines an execution time for a task and then assigns the tasks to one of the thread pools in view of the determined execution time. In one implementation, the execution time can be determined in view of a type of the task (e.g., creating a virtual machine, powering on the virtual machine, waiting for the virtual machine to start, etc.), an average execution time of previous executions of the task and/or other tasks that are of the same or similar type, and/or any other information related to the task. Additionally or alternatively, the execution time can be determined in view of an object to be used by the task, such as the size of the object. For example, a task may involve synchronizing a repository. In addition to or as an alternative to determining an execution time for the task in view of execution times of prior tasks involving synchronizing the repository, the mechanisms can determine the size of the repository. The mechanisms can then assign the task to a thread pool in view of the size of the repository. As an example, the mechanisms assign the task to a thread pool dedicated to long-running tasks in response to determining that the size of the repository is greater than a threshold value. As another example, the mechanisms assign the task to a thread pool dedicated to short-running tasks in response to determining that the size of the repository is equal to or less than the threshold value.

The mechanisms can monitor executions of the tasks in the thread pools and can dynamically reallocate the thread pools accordingly. For example, after initially assigning a task to a thread pool dedicated to short-running tasks, the mechanisms can reassign the task to a thread pool dedicated to long-running tasks in response to determining that the task has been executed for a particular time period (e.g., a time period equal to or greater than a threshold time period associated with the first thread pool). In some implementations, the task can be reassigned if the mechanisms determine that the task can be safely reassigned and that the task can be potentially reassigned to the second thread pool (using check-pointing processes).

Figure 1:
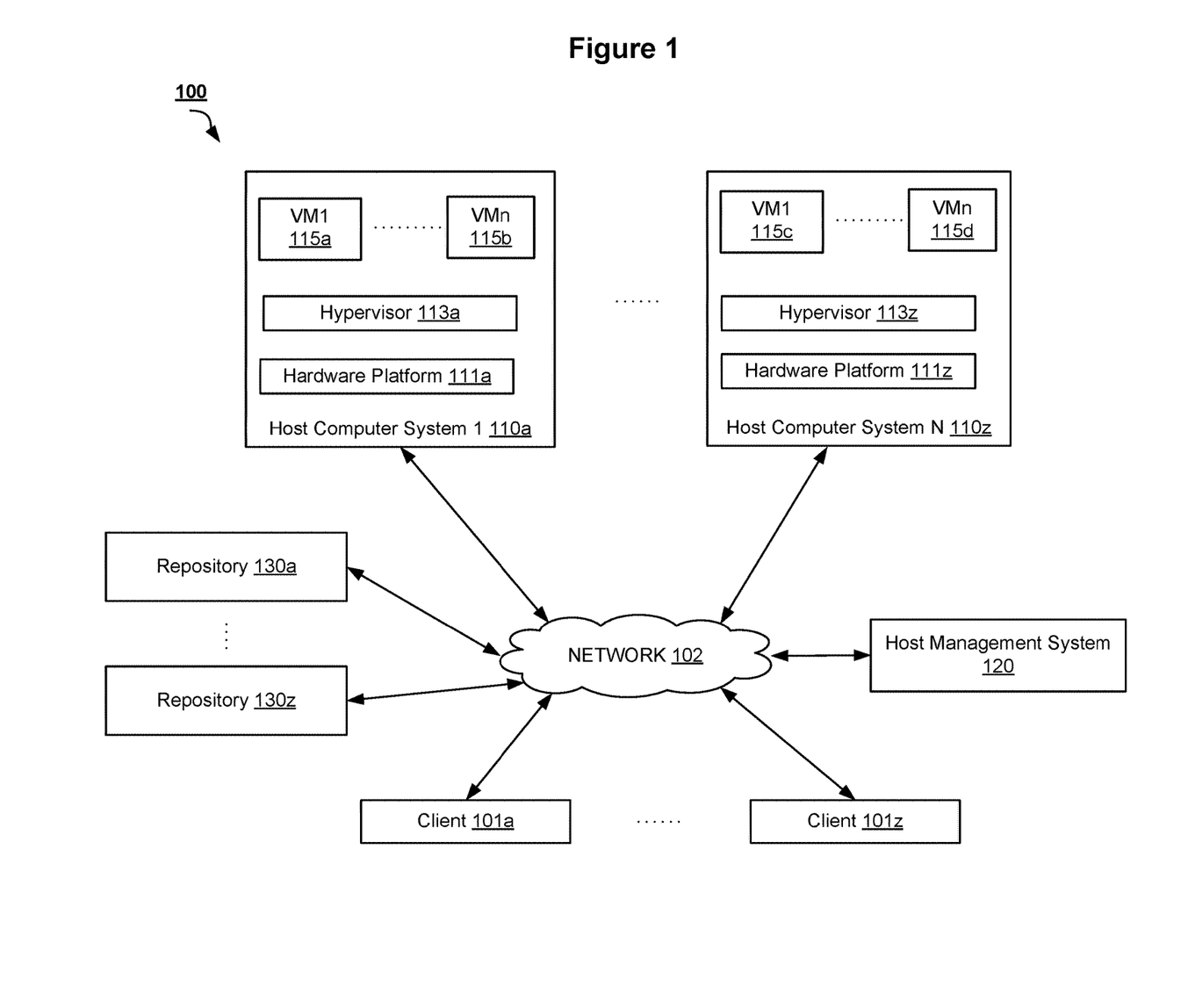
FIG. 1 is a block diagram of a network architecture in which implementations of the disclosure may operate.

FIG. 1 is a block diagram of an example of a computer system 100 in which implementations of the disclosure may operate. As illustrated, system 100 may include one or more client devices 101 communicatively coupled to one or more host computer systems 110a-110z, a host management system 120, one or more repositories 130a-130z, and/or any other component of system 100 via a network 102.

Each client device 101a-101z may include one or more computing devices that have a wide range of processing capabilities. For example, each client device 101a-101z may be a personal computer (PC), palm-sized computing device, personal digital assistant (PDA), table computing device, mobile phone, wearable computing device, and so on. Clients 101a-101z may be fat clients (e.g., clients that perform local processing and data storage), thin clients (e.g., clients that perform minimal or no local processing and minimal to no data storage), and/or hybrid clients (e.g., clients that perform local processing but little to no data storage).

Network 102 may be a private network (e.g., a local area network (LAN), a wide area network (WAN), intranet, etc.) or a public network (e.g., the Internet). Network 102 can provide one or more communication channels for host computer systems 110a-110z and client device(s) 101 to exchange data, commands, and the like. These communication channels can be established using any suitable network protocol, such as the Secure Shell (SSH) protocol, the Simple Protocol for Independent Computing Environments (SPICE) protocol, and/or any other suitable network protocol that can facilitate interactions and/or communication between host computer systems 110a-110z and client device(s) 101a-101z.

The clients 101a-101z may access the host computer systems 110a-110z over the network 102. Each of host computer systems 110a-110z may include a hardware platform (e.g., hardware platform 111a-110z). Each of hardware platform 111a-110z can include one or more processing devices (e.g., central processing units (CPUs)) communicatively coupled to memory devices and input/output (I/O) devices, as described in more details herein below with references to FIG. 4.

Each of host computer systems 110a-110z may run one or more virtual machines (VMs) (e.g., VMs 115a-115d), by executing a hypervisor 113a-113z. Hypervisor 113a-113z can be a software layer above the hardware and below the virtual machines. Hypervisor 113a-113z can abstract the physical layer (e.g., hardware platform 111a-110z), including processors, memory, and I/O devices, and present this abstraction to the virtual machines as virtual devices. A virtual machine 115a-115d may execute a guest operating system which may utilize the underlying virtual devices, including virtual processors, virtual memory, and virtual I/O devices. One or more applications may run on virtual machine 115a-d under the guest operating system. A hypervisor can also be referred to as a virtual machine monitor in some implementations. In some embodiments, hypervisor 113a-z is part of an operating system (OS) of host computer system 110a-110z.

In some implementations, host computer system 110a-110z may be grouped into one or more logical groups, such as one or more clusters (not shown in FIG. 1). In one implementation, a cluster comprises two or more host computer systems sharing certain attributes describing the processor type, networking configuration, and/or storage configuration of the host computer systems.

System 100 may also include a host management system 120 that can perform various management functions for system 100. Host management system 120 may include one or more computer systems, each of which can include one or more processing devices (CPUs) communicatively coupled to memory devices and input/output (I/O) devices, as described in more details herein below with references to FIG. 5.

In some implementations, host management system 120 can manage one or more repositories 130a-130z, each of which can include one or more software packages, errata, destructions, etc. For example, host management system 120 can replicate repositories 130a-130z from a variety of supported sources (e.g., a file system, a storage domain including one or more storage devices, Red Hat™ Network (RHN), etc.) to a local repository (not shown in FIG. 1) hosted in a host computer system 110a-110n. Host management system 120 can provide mechanisms for client device 110a-110z and/or other components of system 100 to gain access to repositories 130a-130z and can provide centralized software installation services for client device 110a-110z and/or other components of system 100.

In some implementations, host management system 120 can perform host discovery, provisioning, configuration, monitoring, and/or any other management function with respect to one or more components of system 100. The host management system 120 may monitor and control VMs 115a-d running on hosts 110a-110z. The host management system 120 can manage one or more of provisioning new VMs, connection protocols between clients 101a-101z and VMs 115a-115d, user sessions (e.g., user authentication and verification, etc.), backup and restore, image management, VM migration, load balancing, network provisioning, storage provisioning, etc. The host management system 120 may configure host machines, configure data centers, add a VM, delete a VM, balance load on a cluster of host machines, provide directory service to the VMs, add storage, define networks, create virtual machines, manage user permission, use templates from the management system (e.g., VM templates that are used for creating new VMs with predefined settings and preinstalled disk images), and perform any other management function.

Host management system 120 may include various interfaces, including administrative interface, reporting interface, and/or application programming interface (API) to communicate with client devices 101a-101z, host computer systems 110a-110z, and/or any other component of system 100 (e.g., user portals, databases, directory servers and various other components which are omitted from FIG. 1 for clarity).

Host management system 120 may provide an interface to client device(s) 101 to enable users of client device(s) 101a-101z to create, configure, manage, etc. various components of system 100. The interface can be a graphical user interface (GUI), a command line interface (CLI), etc. In one example, upon logging into a user portal or an administrative portal provided by host management system 120, a user may request a machine be provisioned in one or more host computer systems 110*a*-110*z* (e.g., via the GUI, the CLI, or any other interface provided by the host management system 120). The provisioning request can include a request to instantiate and/or configure the machine to a predefined known state. The machine can be a physical or virtual machine. The machine can be hosted on one or more host computer systems 110*a*-110*z*. The provisioning request can concern one or more types of provisioning scenarios. For example, the provisioning request can be a request to provision a system that has not previously had an operating system installed (also known as bare metal installations). As another example, the provisioning request can be a request to install one or more virtual machines, such as fully-virtualized guests, para-virtualized guests, etc. As still another example, the provisioning request can be and/or include a request for re-provisioning one or more physical and/or virtual systems.

In another example, the user may manage one or more repositories hosted by one or more host computer systems 110*a*-110*z* (not shown in FIG. 1). The user may request a repository be added, updated (e.g., synchronized with a repository 130*a-z*), deleted, or otherwise managed in a host computer system.

The host management system 120 can provision a machine using one or more particular methods, such as a kickstart installation method, an SSH (Secure Shell) installation method, etc. Using a kickstart installation method, the host management system 120 can provision a machine in view of one or more files that define contents and configuration of the machine and/or any other information that can be used to instantiate the machine, such as partitioning information, network configuration, packages to install for the machine, etc. Such a file is also referred to herein as a "kickstart file." One or more portions of the kickstart files can be provided by a user of system 100. In some implementations, the Preboot eXecution Environment (PXE) can be used to provision a machine using the kickstart method.

The host management system 110 can fulfill a user request (e.g., a provisioning request) by decomposing the user request into one or more tasks and performing the tasks. In one example, the user request can be a request to provision a machine using a kickstart installation method. The host management 120 can fulfill the user request by performing one or more tasks, such as creating a host in a computer system, creating a DNS record for the host, creating a Trivial File Transfer Protocol (TFTP) record for setting up the PXE boot and kickstart files, powering on the host, etc.

As another example, the user request can be a request to provision a machine using an SSH installation method. The host management 120 can fulfill the user request by performing one or more tasks, such as creating a host in a computer system, creating a Domain name System (DNS) record for the host, powering on the host, waiting for the host to start (e.g., waiting until SSH is ready), running an SSH script to finish the provisioning, etc.

As referred to herein, a host can be a physical host, a virtual host, or a combination of one or more physical hosts and virtual hosts. A host can be represented by a host computer system or a virtual machine being executed by a host computer system. In some implementations, a host identifier can be provided by a network address (e.g., an IP address) associated with a network interface of the host a DNS name associated with a network interface of the host, or by any other suitable identifier.

The host computer system 120 can provide parallel executions of multiple tasks utilizing computing resources provided by system 100 or any other computer system. The host computer system 120 can also manage multiple thread pools (e.g., pools of threads, pools of workers, etc.) for executions of the tasks. Each of the thread pools can have any processing capacity (e.g., including a particular number of threads). In one implementation, each of the thread pools can be dedicated to particular tasks (e.g., tasks that can be completed within a predetermined time period). For example, one or more of the thread pools can be dedicated to short-running tasks (e.g., tasks associated with an execution time that is equal to or less than a threshold value). As another example, one or more of the thread pools can be dedicated to long-running tasks (e.g., tasks associated with an execution time greater than a threshold value).

Upon receiving a user request to perform an action in system 100 (e.g., provisioning a machine), host management system 120 can determine one or more tasks to be performed to fulfill the user request. Host management system 120 can then assign each of the tasks to one of the thread pools for execution. For example, host management 120 assigns the tasks to a thread pool dedicated to long-running tasks. As another example, host management system 120 determines an execution time for a given task in view of metadata of the task (e.g., an execution time associated with a past execution of the task, an object associated with or used by the task, etc.). Host management system 120 then assigns the task to a thread pool in view of the execution time (e.g., by assigning the task to a thread pool that is associated with a particular threshold execution time (e.g., a threshold execution time that is greater than the determined execution time).

Host management system 120 can monitor executions of the tasks in the thread pools and can dynamically reallocate the thread pools accordingly. For example, host management system 120 initially assigns a task to a first thread pool associated with a first threshold execution time. Host management system 120 can reassign the task to a second thread pool associated with a second threshold execution time in response to determining that the task has been executed in the first thread pool for a particular time period (e.g., a time period equal to or greater than a threshold time period associated with the first thread pool). In one implementation, the second threshold execution time may be greater than the first threshold execution time.

Further description of host management system 120 and its various functions are described in more detail below with respect to FIG. 2.

Figure 2:
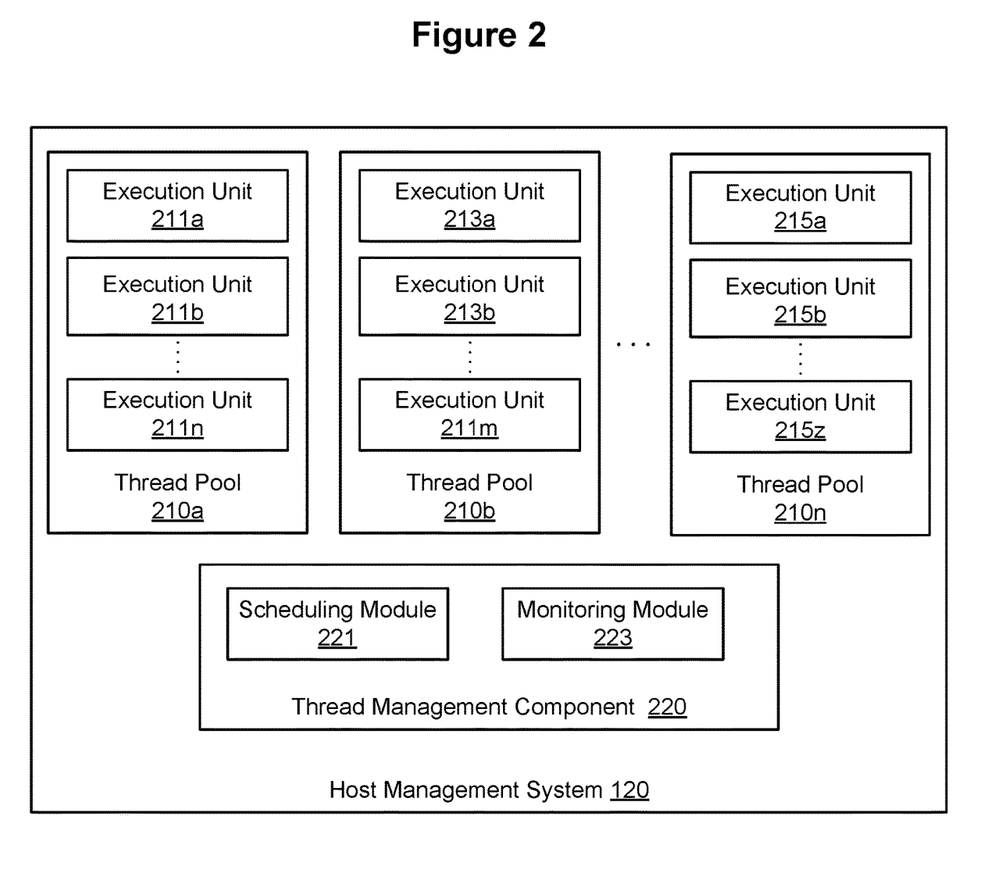
FIG. 2 is a block diagram of a detailed view of a host management system according to an implementation of the disclosure.

FIG. 2 depicts a block diagram illustrating an example of a host management system in accordance with some implementations of the disclosure. The host management system of FIG. 2 may be same as the host management system 120 of FIG. 1.

Host management system 120 can include one or more thread pools 210*a*, 210*b*, and 210*n* that can be utilized to perform various functions, such as providing host discovery, provisioning, configuration, monitoring, and/or any other management functions with respect to a plurality of bare metal hosts, host clusters, virtual machines, etc. Host management system 120 can have any number of thread pools. Each of thread pools 210*a*, 210*b*, and 210*n* can include any number of execution units, such as execution units 211*a-n*, 213*a-m*, and 215*a-z*. Each of the execution units can execute programmed instructions utilizing a certain amount of computing resource (e.g., a certain number of physical and/or virtual processing units). In one example, an execution unit can be a computing thread, such as a system thread, user thread, fiber, etc. In another example, an execution unit can be and/or include a worker (e.g., a program associated with one or more threads to perform one or more tasks). As will be discussed in further detail below, thread management component 220 can allocate one or more tasks (e.g., steps to be performed to fulfill a user request) to a thread pool for execution. Multiple tasks can be organized in a queue for execution in a thread pool.

Each of thread pools 210a, 210b, and 210n can include any number of execution units. In one implementation, each of thread pools 210a, 210b, and 210n can have a particular number of execution units determined in view of the number of waiting tasks, available computing resources, a user preference (e.g., a number defined by a user or administrator of system 120), and/or any other information. Two or more of thread pools 210a-210n may or may not have the same number of execution units.

Thread management component 220 can include a scheduling module 221, a monitoring module 223, and/or any other component for managing thread pools 210a-n and processing user requests in parallel. In one implementation, thread management component 220 can be implemented as part of an operating system of the host computer system (e.g., a host operating system, a guest operating system, etc.). In another implementation, thread management component 220 can be implemented as an application.

Scheduling module 221 can allocate each of thread pools 210a, 210b, and 210n to perform particular tasks in view of the number of execution units (e.g., threads, workers, etc.) available in each of the thread pools, an amount of computing resources associated with each of the thread pools, and/or any other information related to the thread pools. In one implementation, scheduling module 221 can allocate a thread pool to perform tasks that can be completed in a particular time period (e.g., N milliseconds, N seconds, N-M seconds, etc., where N and M are integers). For example, scheduling module 221 can associate the thread pool with a threshold execution time to allocate the thread pool to perform tasks associated with execution times that are not greater than the threshold execution time. As another example, scheduling module 221 can associate the thread pool with multiple thresholds defining a range of execution times (e.g., N-M milliseconds) to allocate the thread pool to perform tasks associated with execution times within the range of execution times. Two or more of thread pools 210a-n may or may not be associated with the same threshold execution times.

Scheduling module 221 can also associate each of thread pools 210a-210n with a threshold time period. As will be discussed in further detail below, scheduling module 221 can reallocate a task being executed in a first thread pool to a second thread pool in response to determining that the task has been executed in the first thread pool for a predetermined time period (e.g., a time period greater than a threshold time period associated with the first thread pool).

In another implementation, scheduling module 221 can allocate a thread pool to perform tasks of one or more particular types (e.g., creating a host, creating a network record, powering on a machine, etc.).

Monitoring module 223 can gather information related to tasks executed in thread pools 210a, 210b, and 210n. For example, monitoring module 223 can determine a type of a given task (e.g., creating a host, creating a virtual network interface, synchronizing a repository, etc.). In another example, monitoring module 223 gathers historical information related to previous executions of the task and/or other tasks of the same or similar type, such as an average execution time of the task and/or the other tasks, an execution time associated with a previous execution of the task, etc. In still another example, monitoring module 223 can gather information related to execution of the given task in a thread pool (e.g., a time period during which the task has been executed, an execution time of the task, etc.). In some implementations, the information related to execution of the given task can later be stored as historical information related to the task. In another example, monitoring module 223 can gather information about an object associated with the task, such as information about a repository to be synchronized or otherwise managed to complete the task. Information related to execution of the given task can be stored as metadata of the task. Monitoring module 223 can collect and/or update information of executions of tasks in the thread pools periodically, at random intervals, responsive to an event (e.g., receiving a user request), and/or in any other suitable manner.

Scheduling module 221 can receive a user request to perform an action (e.g., provisioning a machine, synchronizing a repository, etc.) and can determine an execution plan for the user request. The execution plan can be represented by one or more tasks to be performed to fulfill the user request. Each of the tasks can be a scheduling unit of the execution plan and can include one or more operations to be performed using one or more computing resources (e.g., processing units, memory, etc.). In one implementation, a given task of the execution plan can depend on one or more other tasks of the execution plan. In one implementation, a particular type of user request (e.g., provisioning a machine using a kickstart method) can be decomposed into a set of predetermined tasks.

In one example, scheduling module 221 receives a user request to provision a machine using a kickstart method. Scheduling module 221 can then decompose the user request into multiple tasks, such as creating a host in a computer system, creating a DNS record for the host, creating a TFTP record for setting up the PXE boot and/or one or more kickstart file, and powering on the machine.

In another example, scheduling module 221 receives a user request to provision a machine using an SSH method and then determines an execution plan including multiple tasks, such as creating a host in a computer system, creating a DNS record for the host, powering on the host, waiting for the host to start (e.g., waiting for the SSH is ready), and running an SSH script to finish the configuration.

In still another example, scheduling module 221 receives a user request to create a local repository in a host computer system and then decomposes the user request into one or more tasks, such as creating a directory for the local repository, synchronizing the local repository with a remote repository, etc.

Upon determining the execution plan, scheduling module 221 can assign each of the tasks to one of thread pools 210a-210n. In one implementation, scheduling module 221 can assign the tasks to a thread pool associated with a particular threshold execution time (e.g., the lowest threshold execution time).

In another implementation, scheduling module 221 can assign a given task to a thread pool in view of an execution time of the task. As an example, scheduling module 221 determines an execution time for the task in view of metadata associated with the task (e.g., an average execution time for tasks of the same or similar type, an execution time of one or more past executions of the task, etc.). The thread management component 142 then assigns the task to a thread pool in view of the determined execution time. In one implementation, the task can be assigned to a thread pool associated with a threshold execution time greater than the determined execution time.

As another example, scheduling module 221 determines an execution time for the task in view of information related to an object associated with the task. More particularly, for example, scheduling module 221 identifies a repository to be synchronized (e.g., using an identifier associated with the repository) in some implementations in which the task involves synchronizing the repository. Scheduling module 221 then determines the size of the repository and assigns the task to a particular thread pool in view of the size of the repository. As an example, the thread management component 142 assigns the task to a thread pool associated with a given threshold (e.g., a threshold that is greater than a predetermined value) in response to determining that the size of the repository is less than a threshold repository size. In another example, scheduling module 221 assigns the task to a thread pool associated with a given threshold execution time (e.g., a threshold that is greater than a predetermined value) in response to determining that the size of the repository is equal to or greater than a threshold repository size.

As described above, monitoring module 223 can gather and/or store information related to executions of the tasks in thread pools 210*a-n*. Scheduling module 221 can determine whether any of the tasks is to be reassigned to a new thread pool in view of the information gathered by monitoring module 223. For example, scheduling module 221 determines that a task is to be reassigned to a new pool of execution units in response to determining that the task has been executed for a predetermined time period (e.g., a time period equal to or greater than a threshold time period). In some implementations, a task can be reassigned during execution and/or monitoring of the task if the task can provide "check-points" where the task persists its state before the scheduling module 221 and/or monitoring module 223 can safely reconsider the assignment and potentially reassign this task to another pool.

Figure 3:
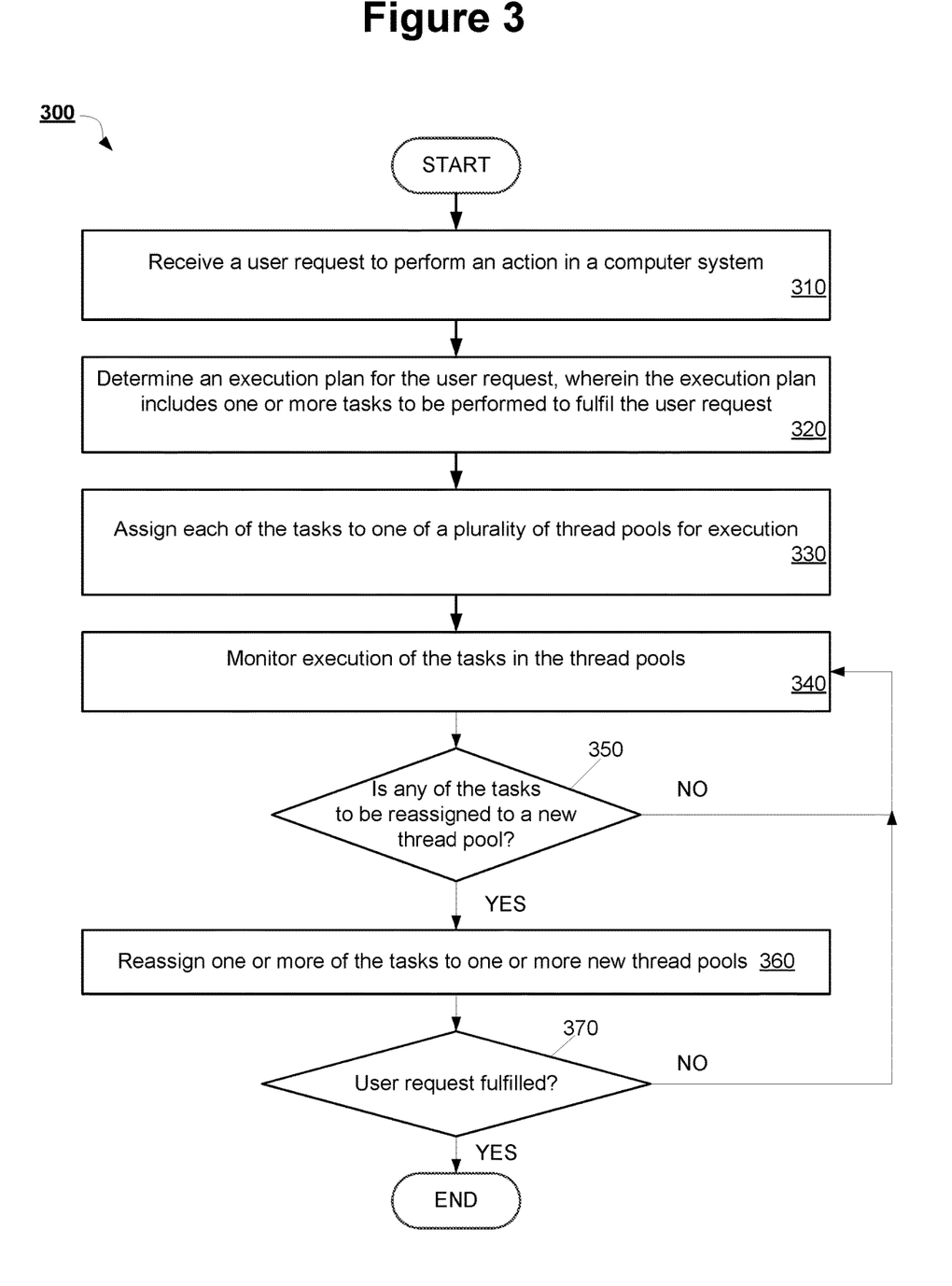
FIG. 3 is a flow diagram illustrating a method for managing thread pools according to an implementation of the disclosure.

FIG. 3 is a flow diagram illustrating a method 300 for managing thread pools according to an implementation of the disclosure. Method 300 can be performed by processing logic that may comprise hardware (e.g., circuitry, dedicated logic, programmable logic, microcode, etc.), software (such as instructions run on a processing device), firmware, or a combination thereof. In one implementation, method 300 is performed by a processing device (e.g., a processing device 402 of FIG. 4) of a host management system as described in connection with FIGS. 1 and 2.

Method 300 begins at block 310 where the processing device receives a user request to perform an action in a computer system. As an example, the processing device can be and/or include a request to provision a machine (e.g., a virtual or physical machine), a request to synchronize a repository, etc.

At block 320, the processing device can determine an execution plan for the user request. The execution plan can be represented by one or more tasks to be performed by the processing device or any other processing device to fulfill the user request.

At block 330, the processing device can assign each of the tasks to one of a plurality of thread pools for execution. Each of the plurality of thread pools can have any number of execution units (e.g., threads, workers, etc.) and can have any processing capacity. In one implementation, the thread pools can include various numbers of threads, workers, and/or any other execution units to handle tasks associated with various execution times. Each of the thread pools can also be associated with a threshold execution time. The thread pools can be and/or include thread pools 210*a-n* as described above in connection with FIG. 2.

In one implementation, the processing device can assign the tasks to a thread pool associated with a particular threshold execution time. For example, the tasks can be assigned to a thread pool that is associated with a low threshold execution time (e.g., the lowest threshold execution time, a threshold between the lowest threshold execution time and the highest threshold execution time, etc.).

In another implementation, the processing device can assign each of the tasks to a thread pool in view of metadata related to the tasks. Examples of metadata related to a task include a type of the task, an object associated with the task, historical data about previous executions of the task and/or other tasks of the same or similar type, etc. As an example, the processing device determines an execution time for a given task in view of historical data about the given task (e.g., an average execution time for tasks of the same or similar type). The processing device then assigns the task to a threshold pool in view of the execution time (e.g. a thread pool associated with a threshold execution time greater than the determined execution time).

As another example, the processing device assigns the task to a thread pool in view of an object associated with the task. More particularly, for example, the processing device determines a size of the object (e.g., a size of a repository to be synchronized) and then assigns the task to a thread pool associated with a threshold execution time in view of the size of the object.

At block 340, the processing device can monitor executions of the tasks in the thread pools. As an example, the processing device can gather information related to a time period during which each of the tasks has been executed, an execution time of each of the tasks, and/or any other information related to executions of the tasks in the thread pool(s). The processing device can also update metadata of the tasks in view of the gathered information.

At block 350, the processing device can determine whether any of the tasks is to be reassigned to a new thread pool. As an example, the processing device determines that a given task is to be reassigned to a new thread pool in response to determining that the task has been executed for a predetermined time period (e.g., a time period equal to or greater than a threshold value). More particularly, for example, the given task may be initially assigned to a first thread pool associated with a first threshold execution time. In response to determining that the task has been executed in the first thread pool for the predetermined time period, the processing device can reassign the task to a second thread pool associated with a second threshold execution time. In one implementation, the second threshold execution time is greater than the first threshold execution time.

In some implementations, the processing device can return to block 340 in response to determining that no task is to be reassigned (e.g., "NO" at block 350). Alternatively, the processing device can proceed to block 360 and can reassign one or more of the tasks to one or more new thread pools in response to determining that one or more tasks are to be reassigned (e.g., "YES" at block 350).

At block 370, the processing device can determine whether the user request has been fulfilled. For example, the processing device determines whether each of the tasks has been completed. In some implementations, the processing device can return to block 340 in response to determining that the user request has not been fulfilled (e.g., "NO" at block 370). Alternatively, the processing device can conclude method 300 in response to determining that the user request has been fulfilled (e.g., "YES" at block 370).

Figure 4:
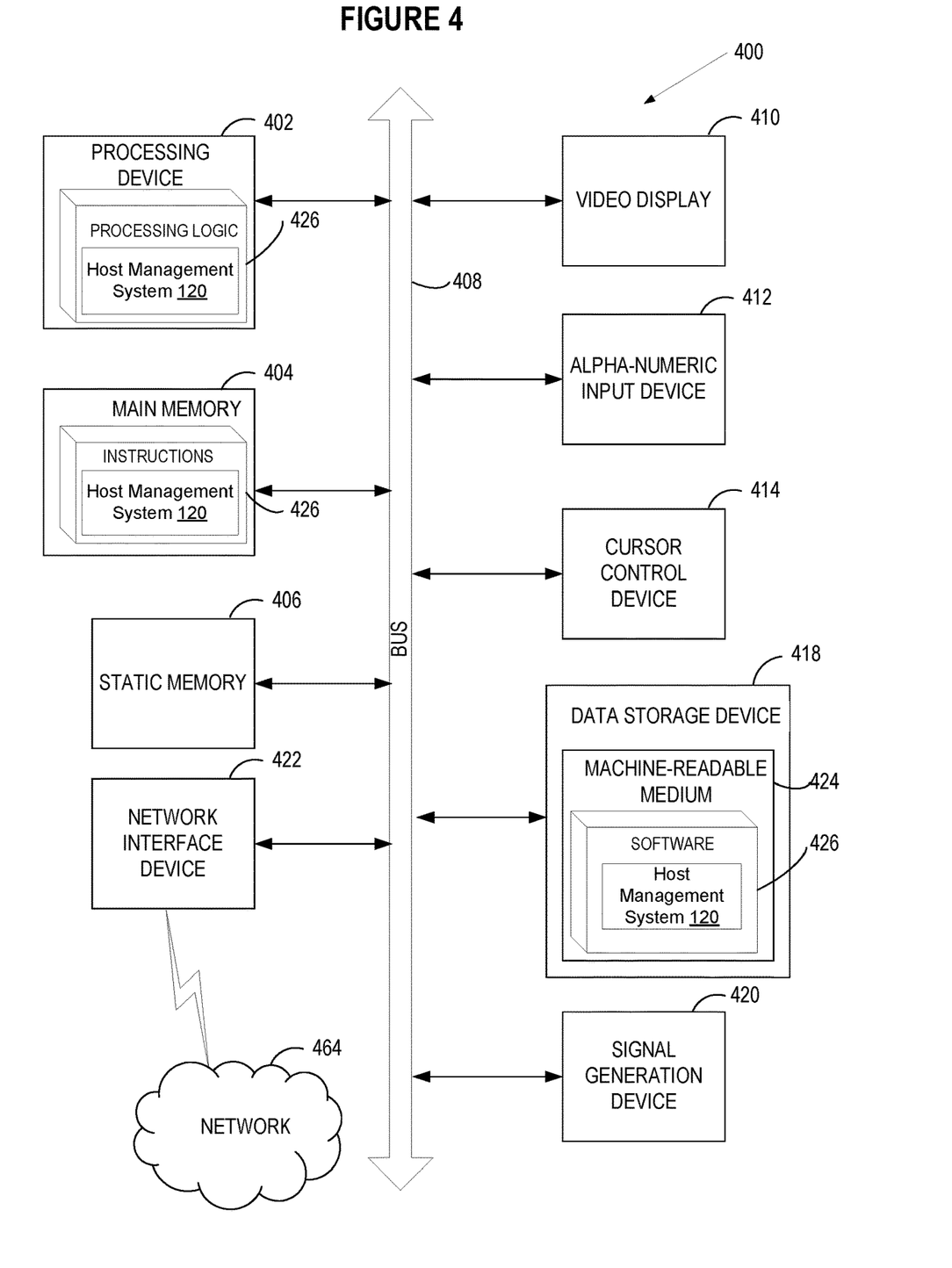
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to manage thread pools, such as the host management system 120 as described with respect to FIGS. 1 and 2, and/or a software library containing methods that call the above applications. While the machine-accessible storage medium 424 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "assigning," "providing," "executing," "removing," "copying," "storing," "monitoring," "reassigning," "managing," "gathering," "storing," "allocating," "determining," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
    assigning, by a processing device, a first task of a plurality of tasks to a first thread pool of a plurality of thread pools for execution, wherein the first task of the plurality of tasks is assigned to the first thread pool of the plurality of thread pools in view of a previous execution time associated with the first task of the plurality of tasks that is less than or equal to a first threshold execution time;
    designating a second thread pool of the plurality of thread pools to execute one or more of the plurality of tasks having an execution time that exceeds the first threshold execution time;
    executing, by the second thread pool of the plurality of thread pools, the one or more of the plurality of tasks having an execution time that exceeds the first threshold execution time;
    monitoring execution of the first task of the plurality of tasks by the first thread pool of the plurality of thread pools to determine a first execution time associated with the first task of the plurality of tasks;
    determining the first execution time associated with the first task of the plurality of tasks exceeds the first threshold execution time; and
    reassigning, by the processing device, the first task of the plurality of tasks to the second thread pool of the plurality of thread pools in view of the determining that the first execution time associated with the first task of the plurality of tasks exceeds the first threshold execution time.

2. The method of claim 1, further comprising executing, by the first thread pool of the plurality of thread pools, the first task of the plurality of tasks.

3. The method of claim 1, further comprising collecting information relating to one or more previous executions of the first task of the plurality of tasks, wherein the information comprises the previous execution time associated with the first task of the plurality of tasks.

4. The method of claim 1, further comprising identifying an execution check-point associated with the first task of the plurality of tasks.

5. The method of claim 4, wherein a state of the first task of the plurality of tasks is stored at the execution check-point associated with the first task of the plurality of tasks.

6. The method of claim 1, further comprising determining an execution plan comprising the plurality of tasks in response to a request for performance of an action.

7. The method of claim 1, wherein the second thread pool of the plurality of thread pools is associated with a second threshold execution time that is greater than the first threshold execution time.

8. A system comprising:
    a memory to store instructions; and
    a processing device, operatively coupled to the memory, the processing device to execute the instructions to:
        assign a first task of a plurality of tasks to a first thread pool of a plurality of thread pools for execution, wherein the first task of the plurality of tasks is assigned to the first thread pool of the plurality of thread pools in view of a previous execution time associated with the first task of the plurality of tasks that is less than or equal to a first threshold execution time;
        designate a second thread pool of the plurality of thread pools to execute one or more of the plurality of tasks having an execution time that exceeds the first threshold execution time;
        execute, by the second thread pool of the plurality of thread pools, the one or more of the plurality of tasks having an execution time that exceeds the first threshold execution time;
        monitor execution of the first task of the plurality of tasks by the first thread pool of the plurality of thread pools to determine a first execution time associated with the first task of the plurality of tasks;
        determine the first execution time associated with the first task of the plurality of tasks exceeds the first threshold execution time; and
        reassign the first task of the plurality of tasks to the second thread pool of the plurality of thread pools in view of the determining that the first execution time associated with the first task of the plurality of tasks exceeds the first threshold execution time.

9. The system of claim 8, wherein the first task of the plurality of tasks is executed by the first thread pool of the plurality of thread pools.

10. The system of claim 8, wherein the processing device is to further execute the instructions to collect information relating to one or more previous executions of the first task of the plurality of tasks, and wherein the information comprises the previous execution time associated with the first task of the plurality of tasks.

11. The system of claim 8, wherein the processing device is to further execute the instructions to identify an execution check-point associated with the first task of the plurality of tasks.

12. The system of claim 11, wherein a state of the first task of the plurality of tasks is stored at the execution check-point associated with the first task of the plurality of tasks.

13. The system of claim 8, wherein the processing device is to further execute the instructions to determine an execution plan comprising the plurality of tasks in response to a request for performance of an action.

14. The system of claim 8, wherein the second thread pool of the plurality of thread pools is associated with a second threshold execution time that is greater than the first threshold execution time.

15. A non-transitory machine-readable storage medium storing instructions that, when executed by a processing device, cause the processing device to:
assign a first task of a plurality of tasks to a first thread pool of a plurality of thread pools for execution, wherein the first task of the plurality of tasks is assigned to the first thread pool of the plurality of thread pools in view of a previous execution time associated with the first task of the plurality of tasks that is less than or equal to a first threshold execution time;
designate a second thread pool of the plurality of thread pools to execute one or more of the plurality of tasks having an execution time that exceeds the first threshold execution time;
execute, by the second thread pool of the plurality of thread pools, the one or more of the plurality of tasks having an execution time that exceeds the first threshold execution time;
monitor execution of the first task of the plurality of tasks by the first thread pool of the plurality of thread pools to determine a first execution time associated with the first task of the plurality of tasks;
determine the first execution time associated with the first task of the plurality of tasks exceeds the first threshold execution time; and
reassign the first task of the plurality of tasks to the second thread pool of the plurality of thread pools in view of the determining that the first execution time associated with the first task of the plurality of tasks exceeds the first threshold execution time.

16. The non-transitory machine-readable storage medium of claim 15, wherein the first task of the plurality of tasks is executed by the first thread pool of the plurality of thread pools.

17. The non-transitory machine-readable storage medium of claim 15, wherein the processing device is further to collect information relating to one or more previous executions of the first task of the plurality of tasks, and wherein the information comprises the previous execution time associated with the first task of the plurality of tasks.

18. The non-transitory machine-readable storage medium of claim 15, wherein the processing device is further to identify an execution check-point associated with the first task of the plurality of tasks.

19. The non-transitory machine-readable storage medium of claim 18, wherein a state of the first task of the plurality of tasks is stored at the execution check-point associated with the first task of the plurality of tasks.

20. The non-transitory machine-readable storage medium of claim 15, wherein the processing device is further to determine an execution plan comprising the plurality of tasks in response to a request for performance of an action.

* * * * *